United States Patent [19]
Wood et al.

[11] Patent Number: 5,688,904
[45] Date of Patent: Nov. 18, 1997

[54] POLYASPARTIC ACID CATALYSIS

[75] Inventors: Louis L. Wood, Rockville; Gary J. Calton, Elkridge, both of Md.

[73] Assignee: Calwood Chemical Industries Inc., Elkridge, Md.

[21] Appl. No.: 724,417

[22] Filed: Oct. 1, 1996

Related U.S. Application Data

[63] Continuation-in-part of Ser. No. 559,049, Nov. 16, 1995, Pat. No. 5,610,264.
[51] Int. Cl.$^6$ .................................................. C08G 69/10
[52] U.S. Cl. ......................... 528/328; 525/418; 525/419; 525/420; 528/327; 528/363
[58] Field of Search ................................. 528/327, 328, 528/363, 418, 419, 420; 510/528, 533; 252/89.1; 525/418, 419, 420

[56] References Cited

U.S. PATENT DOCUMENTS

| | | | |
|---|---|---|---|
| 5,371,180 | 12/1994 | Groth et al. | 528/363 |
| 5,373,088 | 12/1994 | Koskan et al. | 528/363 |
| 5,457,176 | 10/1995 | Adler et al. | 528/328 |

*Primary Examiner*—Terressa Mosley
*Attorney, Agent, or Firm*—William S. Ramsey

[57] ABSTRACT

Polysuccinimide, polyaspartic acid and salts of polyaspartic acid may be prepared by means of heating aspartic acid in the presence of sodium bisulfate. The molecular weight of the polymers may be increased from that obtained without the use of sodium bisulfate. The polysuccinimide, polyaspartic acid or salt of polyaspartic acid obtained have low color. Polyaspartic acid may be obtained in this manner directly from the effluent of an immobilized cell or enzyme column which catalyzes the production of L-aspartic acid without the necessity of intermediate isolation steps.

6 Claims, No Drawings

POLYASPARTIC ACID CATALYSIS

This application is a continuation-in-part of application Ser. No. 08/559,049, filed Nov. 16, 1995, now U.S. Pat. No. 5,610,264.

FIELD OF THE INVENTION

This invention relates to a process for the production of polysuccinimide by sodium bisulfate catalyzed thermal polymerization of aspartic acid and the conversion of said polysuccinimide to polyaspartic acid and salts of polyaspartic acid by hydrolysis.

DESCRIPTION OF RELATED ART

Polyaspartic acid produced thermally consists of a mixture of $\alpha$ and $\beta$ linkages of D and L aspartic acid. The $\alpha$ linkage can be obtained predominantly by hydrolysis of anhydropolyaspartic acid (a synonym for polysuccinimide) by hydrolysis with acid and the $\beta$ linkage can be obtained predominantly by base hydrolysis of anhydropolyaspartic acid as revealed by Pivcova, et al., (H. Pivcova, V. Saudek and H. Drobnik, $^{13}$C N.M.R. Study of the structure of poly(aspartic acid), Polymer, 23, 1237–1241, 1982). Their data (Table 1, p. 1238; Table 3, p. 1239) showed that thermally prepared polysuccinimide was completely hydrolyzed (paragraph 2, col 1, p 1239) with the various acids and bases used and that the $\beta$ fraction was above 57% in every case of base hydrolysis.

The salts of polyaspartic acid in both $\alpha$ and $\beta$ form, and of varying molecular weight and branching, have been found to be useful as fertilizers, detergent anti-redeposition agents, detergent builders, detergent co-builders, plant growth promotion agents, tartar control agents, corrosion inhibition agents, as dispersants of clay, coal, minerals, pigments, and as scale inhibition agents for calcium, barium and strontium salts, in dishwashing detergents, in boiler and cooling water, and for reverse osmosis membranes. One of the primary characteristics that makes them valuable in this respect is the fact that they are biodegradable, whereas other materials that are presently used for this purpose are either not biodegradable, e.g., polyacrylic acid over 1000 molecular weight (m.w.), or harmful to the environment, e.g., polyphosphoric acid.

It has also been reported that variance in m.w. of the polyaspartates gives differing activity in these uses and an appropriate m.w. can be found for each use through evaluation of the differing molecular weights by one of ordinary skill in the art.

Thermally prepared polyaspartate was used in the prevention of boiler scale by changing the crystal structure of calcium salts resulting in the formation of a soft scale (Sarig et al, The use of polymers for retardation of scale formation. Natl. Conc. Res. Dev. [Rep.] (Isr.), 150, 1977). Polyaspartic acid, m.w. 6,000, was found to be superior to polyglutamate, m.w. 14,400, polyvinyl sulfonate, m.w. 5300, and polyacrylic acid, m.w. 6,000, in that it gave 66% retardation of total scale and 90% retardation of calcium sulfate scale.

The thermal preparation of polyaspartic acid has been known for quite some time and the use of phosphoric acid to catalyze the reaction has also been demonstrated in U.S. Pat. No. 3,052,655, where Fox used temperatures of 140°–210° C. with 85% or higher concentrations of phosphoric acid.

Harada, et al (Thermal polycondensation of free amino acids with polyphosphoric acid. Origins Prebiol. systems Their Mol Matrices, Proc. Conf., Wakulla Springs, Fla., 289, 1963) obtained polyaspartic acid from aspartic acid and phosphoric acid at temperatures over 100° C. over a time period of 50–250 hrs, but required temperatures over 170° C. when phosphoric acid was absent.

U.S. Pat. No. 4,839,461 discloses a method for making polyaspartic acid from maleic acid and ammonia by reacting these constituents in a 1:1–1.5 molar ratio by raising the temperature to 120°–150° C. over a period of 4–6 hours and maintaining it for 0–2 hours. The molecular weight range obtained by this method was 1,000–4,000 with a cluster at 1,800–2,000.

U.S. Pat. No. 5,057,597 discloses a method for the polycondensation of aspartic acid to produce polyaspartic acid by heating the aspartic acid in a fluidized bed reactor to 221° C. for a period of 3–6 hours in a nitrogen atmosphere followed by conventional alkaline hydrolysis.

Dessaigne (Comp. rend. 31,432–434 [1850]) prepared condensation products which gave aspartic acid on treatment with nitric or hydrochloric acid by dry distillation of the acid ammonium salts of malic, fumaric or maleic acid at unspecified times and temperatures.

U.S. Pat. No. 5,219,952, discloses the production of high molecular weight polysuccinimide and high molecular weight polyaspartic acid from maleic anhydride and ammonia by means of adding these ingredients to polysuccinimide previously prepared at greater than 150° C. and then heating at greater than 150° C.

U.S. Pat. No. 5,221,733, discloses the manufacture of polyaspartic acid in a rotary tray drier by heating L-aspartic acid to at least 440° F.

U.S. Pat. No. 5,296,578, discloses the production of polysuccinimide and polyaspartic acid from maleic anhydride and ammonia by heating at greater than 170° C. until a theoretical yield of 70% or more is obtained.

U.S. Pat. No. 5,288,783 discloses the preparation of salt of polyaspartic acid by reacting ammonia and fumaric acid, maleic acid or malic acid at temperatures above 190°–350° C. for a period of less than 4 hrs. It also discloses the use of a twin screw extruder at temperatures above 160° C.

U.S. Pat. No. 5,315,010, discloses polyaspartic acid manufacture by introducing L-aspartic acid into a plate drier and elevating the temperature to 370° F. until a conversion of at least 80% has been obtained.

U.S. Pat. No. 5,319,145, discloses a method for preparing polysuccinimides with a rotary tray dryer by introducing L-aspartic acid into the dryer and heating to 120° to 300° C. for 1 to 10 hrs.

U.S. Pat. No. 5,367,047 discloses the preparation of salt of polyaspartic acid by reacting ammonia and fumaric acid, maleic acid or malic acid at temperatures above 190°–350° C. for a period of less than 4 hrs. It also discloses the use of a twin screw extruder at temperatures above 160° C.

U.S. Pat. No. 5,371,180, discloses a process for the preparation of polysuccinimide and polyaspartic acid by reacting fumaric acid or maleic acid and maleic anhydride and ammonia into a twin shaft extruder which is self cleaning and heating to 100° to 300° C.

U.S. Pat. No. 5,373,088, discloses the production of polyaspartic acid from maleic acid and ammonia by heating solid ammonium maleate to at least 170° C. and maintaining the temperature until polysuccinimide is obtained.

The production of L-aspartic acid by an enzyme or immobilized cell column has been disclosed in U.S. Pat. No. 4,436,813.

SUMMARY OF THE INVENTION

Polymers of aspartic acid which are suitable for fertilizers, detergent anti-redeposition agents, detergent builders, detergent co-builders, growth promotion agents, tartar control agents, corrosion inhibition agents, as dispersants of clay, coal, minerals, pigments, and as scale inhibition agents for calcium, barium and strontium salts, in dishwashing detergents, in boiler and cooling water, and for reverse osmosis membranes, may be obtained by heating aspartic acid in the presence of sodium bisulfate, followed by hydrolysis of the resulting polysuccinimide. Either D-aspartic acid, L-aspartic acid or mixtures of the two may be used as the aspartic acid of the invention. The same product is obtained upon sufficient heating to effect polymerization and the formation of polysuccinimide destroys the configuration around the asymmetric carbon.

We have found that sodium bisulfate serves as a catalyst for the production of high molecular weight polysuccinimide and through its hydrolysis, polyaspartic acid and salts of polyaspartic acid. The color of this reaction is very low and the materials are strikingly similar to those of polyaspartic acid prepared with phosphoric acid as the catalyst. The sodium bisulfate concentration is preferably greater than 12% and less than 75% by weight of aspartic acid. A mixture of sulfuric acid and a source of the sodium ion for neutralization of a sodium salt by such compounds as NaOH, $NaHCO_3$, $Na_2CO_3$, thus providing sodium bisulfate through the reaction of the sulfuric acid by the added base, at a concentration which is within the limits given above may also be used. Heating aspartic acid in the presence of the sodium bisulfate, at a temperature of 150° to 350° C., until such time as polysuccinimide has been formed to the desired degree readily effects the polymerization to polysuccinimide. A preferred temperature range of 200° to 300° C. and an especially preferred range of 220° to 280° C. provide rapid polymerization under these conditions. When the theoretical quantity of water formed in the production of polysuccinimide has been removed, which occurs in a time directly proportional to the temperature, the reaction mixture is allowed to cool. Time and temperature may be varied to obtain both the optimum color and molecular weight. Lower temperatures take longer times to achieve the m.w. increase than do higher temperatures, while both time and temperature may affect the color of the final product. The polysuccinimide thus formed can be used to make other useful products or may be hydrolyzed to a salt of polyaspartic acid with either the α or β linkage, the result depending on the hydrolyzing agent. The hydrolysis may be carried out in water or in organic solvent. Formulations of the salts of polyaspartic acid prepared in this manner have the excellent performance in the uses given above and have the advantage of being of significantly higher in molecular weight range than do the polymers formed by the thermal polymerization of aspartic acid without any catalyst. The use of phosphoric acid as a catalyst will give the same molecular weights and color, but has the disadvantage of being environmentally harmful due to eutrophication in lakes and streams to which the materials ultimately pass as they are used as described as above. Although the phosphates may be washed from the polysuccinimides successfully due to their differing solubilities, low level contamination is always possible and potentially harmful to the environment. Additionally the extra steps required to rid the polysuccinimide of the phosphates are costly, whereas the addition of base to the polysuccinimide formed merely incorporates additional sodium sulfate as the end product, which is itself a component of many of the end use formulations, especially detergents.

The invention also includes a process for the production of a polyaspartate salt in which the L-aspartic is prepared enzymatically by passing an aqueous solution of ammonium fumarate over a bed of immobilized cells or immobilized enzyme column, in which the enzyme is aspartase or in which the cells contain aspartase, to produce an aqueous solution of ammonium aspartate. Without further purification the column effluent may be basified by addition to the solution of ammonium aspartate of a quantity of a base equimolar to the aspartate. This bases may be selected from the group of bases consisting of sodium hydroxide, sodium bicarbonate, sodium carbonate, potassium hydroxide, potassium bicarbonate and potassium carbonate. Reducing the volume of the basified solution by means of evaporation of a part of the aqueous solution at constant heat and reduced pressure or increased heat and reduced or atmospheric pressure results in the removal of the ammonia contained in the solution. Subsequently acidifying the solution with an equimolar quantity of sulfuric acid produces a solution of aspartic acid and sodium bisulfate. Upon heating the solution in a suitable reactor at a temperature of 110°–300° for a sufficient length of time that at least 60% of the aspartic acid is converted to polysuccinimide. The length of time required depends on the temperature to which the solution is heated. The water of solution is first removed and then the water of condensation must be removed to effect the polymerization. As disclosed in the patents above, various reactors are suitable for this removal. The polymerization step can be carried out discontinuously or continuously in suitable reactors. Reactors to be employed discontinuously are, for example, kneading machines or paddle driers. All high-viscosity reactors which allow removal of the water vapor released, preferably those having large reaction volumes, and preferably also those having kinematic self-cleaning of the surfaces which come into contact with the product and likewise preferably those with shaft heating can be employed. Machines of corrosion-resistant material, for example stainless steel, are preferably employed for corrosion resistance. Twin screw extruders built according to these principles have been shown to be effective reactors for this reaction. At this point an optional step may be inserted in which the virtually insoluble polysuccinimide is washed with water to remove the sodium bisulfate which has a high degree of solubility in water. The polysuccinimide formed may be hydrolyzed with a base selected from the group of bases consisting of sodium hydroxide, sodium bicarbonate, sodium carbonate ammonium hydroxide, ammonia, potassium hydroxide, potassium carbonate and potassium bicarbonate to provide solution of a salt of polyaspartic acid. At this point an optional step may be inserted in which the polyaspartate solution is treated with hydrogen peroxide to reduce color. This step may be included with or without the water wash step to provide the same color reduction. Such hydrolysis may also be carried out in detergent formulations containing one or more of these bases.

The object of this invention is to provide a means of preparing polysuccinimide by means of heating in the presence of sodium bisulfate as a catalyst. Another object of the invention is to provide means of preparing polyaspartic acid and salts of polyaspartic acid by hydrolyzing the polysuccinimide formed in the reaction. Yet another object of the invention is to provide a high m.w. polysuccinimide, polyaspartic acid and salts of polyaspartic acid. Still another object of this invention is to provide a polysuccinimide, polyaspartic acid or salt of polyaspartic acid having low color. Yet another object of this invention is the preparation of a polyaspartic acid that is not contaminated by phosphorous or phosphorous containing compounds. A further object of the invention is to provide a means of producing polyaspartic acid directly from the effluent of an immobilized cell or enzyme column which catalyzes the production of L-aspartic acid without the necessity of intermediate isolation steps.

DETAILED DESCRIPTION OF THE EMBODIMENTS

Example 1. Thermal Polymerization of L-Aspartic Acid at 220° C.

L-aspartic acid was rapidly mixed at 220° C. for 20 min. to give polysuccinimide as a pink powder. This solid was slurried with aqueous sodium hydroxide at 60°–70° C. The resultant clear red-brown solution of sodium polyaspartate was subjected to analysis by gel permeation chromatography (GPC).

GPC was carried out on a 1.5×14 cm column of SEPHADEX G-75 (a registered trademark of Pharmacia, Piscataway, N.J. for pore exclusion chromatographic medium), using a mobile phase of 5.5 g $NaH_2PO_4$ and 5.7 g $Na_2HPO_4$ per 4L of distilled water at a flow rate of 0.5 mL/min, with detection at 220 nm. Under these conditions the polymer had a retention time of 33 min.

Example 2. Thermal Polymerization of Mono-Ammonium Maleate at 250° C.

Maleic anhydride was added to water to provide maleic acid, after which one equivalent of ammonia was added to prepare an aqueous slurry of mono-ammonium maleate. This slurry was rapidly mixed at 250° C. for 20 min to give polysuccinimide as a water insoluble, pinkish-tan friable powder. This solid was dissolved in an aqueous solution of sodium hydroxide to form a clear red-brown solution of sodium polyaspartate. GPC was carried out as in Example 1 and the retention time of this polymer was 38 min.

Example 3. Thermal Polymerization of L-Aspartic Acid at 260°–265° C. at 30% $H_3PO_4$ concentration L-aspartic acid was slurried with 85% $H_3PO_4$, in a 7:3 weight aspartic acid to 85% $H_3PO_4$ weight, ratio and heated with comminution due to the action of the reactor blades, at 260°–265° C. for 30 min. to give polysuccinimide as a pink powder. This solid was slurried with one equivalent of aqueous sodium hydroxide and maintained at 60°–70° C. until the polysuccinimide had gone into solution, indicating the formation of the water soluble sodium polyaspartate. The resultant clear red-brown solution of sodium polyaspartate was subjected to analysis by GPC, carried out as in Example 1, and had a retention time of 25.5 min.

Example 4. Thermal Polymerization of L-Aspartic Acid at 260°–265° C. at 30% $H_3PO_4$ concentration L-aspartic acid was slurried with 85% $H_3PO_4$, in a 7:3 ratio and heated with agitation at 260°–265° C. for 10 min. to give polysuccinimide as a pink powder. This solid was slurried with aqueous sodium hydroxide at 60°–70° C. The resultant clear red-brown solution of sodium polyaspartate was subjected to analysis by GPC, carried out as in Example 1, and had a retention time of 26 min.

Example 5. Thermal Polymerization of L-Aspartic Acid at 230°–235° C. at 25% $H_3PO_4$, concentration L-aspartic acid was slurried with 85% $H_3PO_4$, in a 75:25 ratio and heated with mixing and kneading at 230°–235° C. for 30 min. to give polysuccinimide as a pink powder. This solid was slurried with aqueous sodium hydroxide at 60°–70° C. The resultant clear red-brown solution of sodium polyaspartate was subjected to analysis by GPC, carried out as in Example 1, and had a retention time of 26 min.

Example 6. Thermal Polymerization of L-Aspartic Acid at 260°–265° C. at 20% $H_3PO_4$ concentration L-aspartic acid was slurried with 85% $H_3PO_4$, in a 8:2 ratio and heated with comminution at 260°–265° C. for 10 min. to give polysuccinimide as a pink powder. This solid was slurried with aqueous sodium hydroxide at 60°–70° C. The resultant clear red-brown solution of sodium polyaspartate was subjected to analysis by GPC, carried out as in Example 1, and had a retention time of 27 min.

Example 7. Thermal Polymerization of L-Aspartic Acid at 150°–210° C. at 16% $H_3PO_4$ concentration L-aspartic acid was slurried with 85% $H_3PO_4$, in a 84:16 ratio and heated with comminution at 150°–210° C. for 4 hr. to give polysuccinimide as a pink powder. This solid was slurried with aqueous sodium hydroxide at 60°–70° C. The resultant clear red-brown solution of sodium polyaspartate was subjected to analysis by GPC, carried out as in Example 1, and had a retention time of 27 min.

Example 8. Thermal Polymerization of L-Aspartic Acid at 200°–235° C. at 12.8% $H_2SO_4$ concentration L-aspartic acid was slurried with 98% $H_2SO_4$, in a 87.2:12.8 ratio and heated with comminution at 200°–235° C. for 20 min. to give polysuccinimide as a pink powder. This solid was slurried with aqueous sodium hydroxide at 60°–70° C. The resultant clear red-brown solution of sodium polyaspartate was subjected to analysis by GPC, carried out as in Example 1, and had a retention time of 33.5 min.

Example 9. Thermal Polymerization of L-Aspartic Acid at 230°–235° C. at 50% $H_2SO_4$ concentration L-aspartic acid was slurried with 98% $H_2SO_4$, in a 1:1 molar ratio and heated with comminution at 190°–205° C. for 30 min. to give a water soluble, black product which contained very little polysuccinimide.

Example 10. Thermal Polymerization of L-Aspartic Acid at 260°–265° C. at 50% $NaHSO_4$ concentration L-aspartic acid was slurried with $NaHSO_4$, in a 1:1 molar ratio and heated with comminution at 260°–265° C. for 30 min. to give polysuccinimide as a pink powder. This solid was slurried with aqueous sodium hydroxide at 60°–70° C. The resultant clear red-brown solution of sodium polyaspartate was subjected to analysis by GPC, carried out as in Example 1, and had a retention time of 27.5 min.

Example 11. Thermal Polymerization of L-Aspartic Acid at 230°–235° C. at 50% $NaHSO_4$ concentration L-aspartic acid (6.7 g, 0.05 moles) was slurried with $NaHSO_4$, (7.0 g, 0.05 moles), a 1:1 molar ratio, in 20 mL of water and heated with tumbling in a rotary evaporator at 230°–235° C. for 13 min. to give 11.6 g of white semi-solids. A 1.0 g portion of this semi-solid was slurried with 1 mL of aqueous 40% sodium hydroxide. The resultant clear pale yellow solution of sodium polyaspartate was subjected to analysis by GPC, carried out as in Example 1, and had a retention time of 35 min.

The remaining 10.6 g was then tumbled at 230°–235° C. for 10 min to give 9.9 g of tan solids. A 1.0 g portion was dissolved in 1 g of water containing 1 g of aqueous 40% NaOH to give a clear brown solution. GPC of this solution, carried out as in Example 1, showed a broad peak of sodium polyaspartate centered at 29 min.

The remaining 8.9 g was then tumbled at 230°–235° C. for 10 min to give 8.8 g of tan solids. A 1.0 g portion was dissolved in 1 g of aqueous 40% NaOH to give a clear brown solution. GPC of this solution, carried out as in Example 1, showed a broad peak of sodium polyaspartate centered at 26 min. Addition of 0.1 g of 30% $H_2O_2$ gave a clear pale yellow solution whose GPC was unchanged.

Example 12. Conversion of an L-aspartic acid enzyme column production stream

Passage of a 1.5M solution of ammonium fumarate, pH 8.5, over an enzyme column containing immobilized aspartase or microbial cells containing the enzyme aspartase, gives a solution that is 1.5M in L-aspartic acid and 1.7M in ammonia. Solutions containing these proportions may be used to test the effectiveness of treatments of the enzyme column effluents. Other levels of ammonium fumarate may be used to prepare L-aspartic acid as indicated by Calton (Preparation of L-Aspartic Acid, *Biocatalytic Production of Amino Acids & Derivatives*, Hanser, Munich, 1992).

To a solution containing 10.0 g (0.0752 moles) of L-aspartic acid, 1.44 g (0.08 moles) $NH_3$ and 89 g of water was added 3.1 g of 97% NaOH (0.075 moles), thus preparing a solution of the. The solution was concentrated by evaporation at ambient pressure, with heating to 27 g of a clear solution having no odor of $NH_3$ and a pH of 7.5. An aqueous solution of $H_2SO_4$ (98%, 7.5 g in 20 g of water) was added and the resultant slurry of white solids was comminuted at 260°–265° C. for 30 min. to give 15.8 g of tan solids. Theoretical yield for this reaction is 16.3 g. A 7.9 g portion was dissolved in 15 mL of water containing 3 g NaOH and the resultant clear, light brown solution had a pH of 10.5 and the GPC, carried out as in Example 1, showed a retention time of 28 min.

Example 13. Conversion of an L-aspartic acid enzyme column production stream

An artificial effluent from an immobilized cell column was prepared containing 10.0 g (0.0752 moles) of L-aspartic acid, 1.36 g (0.08 moles) $NH_3$ and 50 g of water (according to U.S. Pat. No. 4,436,813). The solution was treated with 4.0 g $Na_2CO_3$ (0.075 equivalents) to basify. The resulting solution (pH 10) was concentrated by evaporation at elevated temperature to achieve removal of excess ammonia, to a volume of 25 mL of a clear solution which had no odor of $NH_3$ and a pH of 7.0. $H_2SO_4$ (98%, 7.4 g) was added (dropping the pH to 1 and forming 0.075 equivalent of sodium bisulfate). The resultant slurry of white solids was mixed vigorously at 260°–265° C. for 30 min. to give polysuccinimide (14.8 g of tan solids). A 1.0 g portion was dissolved in 1 mL of water containing 1 g of aqueous 40% NaOH to provide an aqueous solution of sodium polyaspartate. GPC, carried out as in Example 1, showed a retention time of 28.5 min.

The remaining 13.8 g of polysuccinimide was then agitated at 260°–265° C. for 10 min to give 13.6 g of tan solids. A 1.0 g portion was dissolved in 1 g of water containing 1 g of aqueous 40% NaOH to give a clear brown solution. GPC of this solution, carried out as in Example 1, showed a broad peak centered at 27 min. Addition of 0.15 g of 30% $H_2O_2$ gave a clear pale yellow solution whose GPC was unchanged.

The remaining 12.6 g was then agitated at 260°–265° C. for 10 min to give 12.1 g of tan solids. A 1.0 g portion was dissolved in 1 g of water containing 1 g of aqueous 40% NaOH to give a clear brown solution. GPC of this solution, carried out as in Example 1, showed a broad peak centered at 27 min.

Example 14. Thermal polymerization of L-aspartic acid and $NaHSO_4$ at 260°–265° C.

A slurry of 6.7 g (0.05 moles) of L-aspartic acid and 14 g $NaHSO_3.H_2O$ (0.01 moles) in 20 mL of water was tumbled in a salt bath at 260°–265° C. for 2 min to remove the water and the residual white solids were tumbled at 260°–265° C. for 5 min. The solids were allowed to cool to room temperature, pulverized and then heated for an additional 5 min at 260°–265° C. to give 17.1 g of tan solids (theory 16.8 g). A 1.0 g portion was dissolved in 1 g of water containing 1 g of aqueous 40% NaOH to give a clear brown solution. GPC of this solution, carried out as in Example 1, showed a broad peak centered at 32 min.

The remaining 16.1 g was then agitated at 260°–265° C. for 10 min to give 15.2 g of tan solids. A 1.0 g portion was dissolved in 1 g of water containing 1 g of aqueous 40% NaOH to give a clear brown solution. GPC of this solution, carried out as in Example 1, showed a broad peak centered at 26.5 min.

The remaining 14.2 g was then agitated at 260°–265° C. for 10 min to give 14.0 g of light brown solids. A 1.0 g portion was dissolved in 1 g of water containing 1 g of aqueous 40% NaOH to give a clear brown solution. GPC of this solution, carried out as in Example 1, showed a broad peak centered at 26.0.min.

Example 15. Thermal polymerization of L-aspartic acid and $NaHSO_4$ at 190°–210° C.

Ten lbs of an aqueous slurry (pH 1.0, density, 1.6) composed of 3.76 lbs (12.8 moles) of L-aspartic acid, 3.43 lbs (12.9 moles) of sodium hydrogen sulfate and 2.81 lbs of water was placed in a heated reactor at 200°–225° C. The slurry was heated for 180 minutes with comminution by the blades of the reactor and samples were taken at 90, 120 and 180 min. During the first 30 min. The reactants became a white semi-solid paste and their temperature ranged from 100°–160° C. During the next 30 min, the reactants turned to a viscous semi-solid melt as their temperature rose to 190° C. At this point, the melt turned to a brittle solid which was rapidly pulverized by the reactor's impeller to a white powder. The powder was agitated in the reactor as the temperature climbed to 210° C. The polysuccinimide formed and $NaHSO_4$ weighed 5.58 lbs (95% of theoretical 6.16 lbs).

For GPC, 1.0 g samples of the product were slurried with 1.0 g of water and dissolved in 0.9 g 40% aqueous NaOH to give clear light tan solutions of sodium polyaspartate and sodium sulfate. The results of the GPC, carried out as in Example 1, showed a broad peak at 26.5 min for the 90 minute sample. The peak shifted to 26 min for the 120 min. sample and remained at that molecular weight for the 180 min. sample.

In order to wash the sodium bisulfate from the polysuccinimide, a 50 g portion of the polysuccinimide-sodium bisulfate mixture was slurried in 50 mL of water at 90°–95° C. for 30 min. The slurry was readily filtered using Whatman #1 filter paper. The wet cake of solids was rinsed with 15 mL of water and reslurried as before. The solids were again collected and rinsed and the filter cake was dried for 12 hrs at 65° C. to give 22.4 g (theoretical yield of 22.2 g of polysuccinimide if the sodium bisulfate was originally present as pyrosulfate, which is anhydrous and 23.3 g if the sodium bisulfate was present as the monohydrate) of off-white powder which was essentially pure polysuccinimide. Analysis of the residual ash gave less than 0.065%, the lower limit of the assay.

A 5.0 g portion of the $NaHSO_4$ free polysuccinimide prepared above was slurried in 15 g of water at 95°–100° C. To this was added 2.5 g $Na_2CO_3$ over a period 15 min. At this point an additional 4.7 g portion of polysuccinimide was added (for a total of 9.7 g, 0.1 formula wt.). Over a period of 15 min, an additional 2.75 g of $Na_2CO_3$ was added in small portions to the well stirred slurry at 95°–100° C. And the solutions was stirred for an additional 30 min to give a clear brown solution, pH 9.5. Hydrogen peroxide (0.1 g, 30%) was added at 60°–70° C. to decolorize the sodium polyaspartate solution and the previously brown solution became a clear light yellow. GPC of this solution, carried out as in Example 1, showed a broad peak of sodium polyaspartate centered at 26 min.

Example 16. Thermal polymerization of L-aspartic acid and $NaHSO_4$ at various ratios and temperatures Polysuccinimide and sodium polyaspartate were prepared as in Example 15, at the times, temperatures, quantities of L-aspartic acid (L-asp), quantities of $NaHSO_4$ and the process was sampled at the times shown. The polysuccinimide formed was then hydrolyzed as in Example 15 and the GPC was run. In each case, the polysuccinimide formed was off-white in color with the exception of the run at 300°–305° C. where the color of the polysuccinimide was slightly darker.

| L−asp (g) | $NaHSO_2$ (g) | molar ratio $NaHSO_4$/L−asp | Temp °C. | GPC @10 min | GPC @20 min | GPC @30 min | GPC @60 min | yield (g) | yield (%) theory |
|---|---|---|---|---|---|---|---|---|---|
| 6.7 | 0 | 0 | 260–265 | 32 | 32 | 31.5 | — | 4.9 | 100 |
| 6.7 | 0.31 | 0.05 | 260–265 | 33 | 31 | 32 | — | 5.2 | 102 |
| 6.7 | 0.6 | 0.1 | 260–265 | 33 | 31.5 | 31 | — | 5.1 | 93 |
| 13.3 | 3.0 | 0.25 | 260–265 | 30 | 29 | 28 | — | 12.1 | 95 |
| 6.7 | 3.0 | 0.5 | 260–265 | 30 | 27.5 | 27 | — | 7.2 | 90 |
| 6.7 | 4.6 | 0.75 | 260–265 | 28 | 26 | 26 | — | 9.3 | 98 |
| 13.3 | 12 | 1.0 | 260–265 | 26.5 | 26.5 | 27 | — | 22.5 | 104 |
| 6.7 | 7.6 | 1.25 | 260–265 | 30 | 26 | 27.5 | — | 12.5 | 100 |
| 6.7 | 12.0 | 2.0 | 260–265 | 32 | 26.5 | 26 | — | 16.0 | 94 |
| 13.3 | 12.0 | 2.0 | 220–225 | — | — | — | 28 | 21.3 | 98 |
| 6.7 | 6.0 | 1.0 | 230–235 | 35 | 29 | 26 | — | 10.8 | 99 |
| 6.7 | 6.0 | 1.0 | 300–305 | 27 | 26 | 26.5 | — | 9.8 | 90 |

The data in the table show that the catalytic effect of sodium bisulfate begins to take effect at 5% with a slight decrease in GPC retention time at equivalent times of heating, which would indicate a slightly higher molecular weight. It is also apparent that the time the L-aspartic acid and the sodium bisulfate were heated could be varied to achieve the molecular weight desired. The color was marginally affected by heating beyond the time at which the polysuccinimide reached a maximum m.w.

Example 17. Thermal polymerization of L-aspartic acid catalyzed by $NaHSO_4$ in an oven at 150°–180° C.

A slurry of 133 g (1 mole) of L-asp and 120 g (1 mole) of $NaHSO_4$ in 100 g of water was placed as a ¼" thick layer in a glass pan in an oven at 150°–180° C. Samples (1 g) were taken at the times in the following table. After 8 hrs, 211.3 g (corrected for samples removed, 97.4% of theory). The samples were dissolved in 2 g of water and 0.9 g 40% aqueous NaOH to provide polyaspartic acid for GPC analysis.

| Time (hrs) | GPC (min) | color |
|---|---|---|
| 4 | 38 | pale yellow |
| 5 | 33 | pale yellow |
| 6 | 28 | yellow |
| 8 | 28 | yellow |

This shows that thin layers of the reactants will condense in the same manner as those vigorously stirred and that the time-temperature profile required may be adjusted to provide material of the desirable molecular weight and color.

Example 18. Hydrolysis of polysuccinimide containing $NaHSO_4$ with $Na_2CO_3$ A 50 g portion of polysuccinimide prepared by vigorously kneading L-asp with an equivalent weight of $NaHSO_4$ at a temperature of 220° C. for 30 min, was slurried in 150 g of water at 95° C. while portions of $Na_2CO_3$ were added over a period of 45 min with evolution of $CO_2$. A total of 32 g of $Na_2CO_3$ was required to achieve a clear tan solution after stirring several hours at 90° C. The addition of 0.5 g of 30% hydrogen peroxide gave a clear yellow solution. GPC analysis showed a retention time of 26.5 min.

Example 19. Thermal polymerization of L-aspartic acid catalyzed by $NaH_2PO_4$ A slurry of 6.7 g (0.05 moles) of L-aspartic acid and 6.9 g (0.05 moles) of $NaH_2PO_4 \cdot H_2O$ in 20 g of water was tumbled at 265° C. for 30 min. Samples (1 g) were taken at 10, 20 and 30 min. Corrected for samples removed, there remained 10.6 g (theory 10.8 g) of a light tan powder at 30 min.

The samples were hydrolyzed and the GPC run as in Example 1. The 30 min sample had a peak at 35 min and was orange in color, thus showing that $NaH_2PO_4$ is not as good a catalyst as $NaHSO_4$.

Example 20. Addition of excess base and NaHSO$_4$

An artificial effluent from an immobilized cell column was prepared containing 10.0 g (0.0752 moles) of L-aspartic acid, 1.40 g (0.08 moles) NH$_3$ and 50 g of water was mixed with 6.0 g NaOH (0.15 equivalents). The resulting solution was concentrated by evaporation at elevated temperature to achieve removal of excess ammonia, to a volume of 27 mL. To this solution H$_2$SO$_4$ (98%, 14.8 g in 15 mL of water) was added slowly. The resultant slurry of white solids was mixed vigorously at 260°–265° C. for 30 min. to give 25.2 g of a pink-tan powder containing polysuccinimide. A 1.0 g portion was dissolved in 1 mL of water containing 1 g of aqueous 40 % NaOH to provide an aqueous solution of sodium polyaspartate. GPC, carried out as in Example 1, showed a retention time of 26 min. indicating a molecular weight around 10,000.

Example 21. Reaction of an aspartic acid stream with low levels of NaHSO$_4$ The conditions of Example 20 were repeated but the amount of NaOH was reduced to 3.0 g NaOH (0.075 moles) and the H$_2$SO$_4$ was reduced to 5.5 g (0.056 moles). The product obtained upon thermal polymerization weighed 13.4 g and was a tan solid containing polysuccinimide.

A clear brown solution containing sodium polyaspartate was obtained from 1.0 g of the tan solids upon reaction with 1.0 g of 40% NaOH in 1.0 mL of water. GPC showed a broad peak centered at 27 min. indicating a molecular weight of 7,000–10,000.

It will be apparent to those skilled in the art that the examples and embodiments described herein are by way of illustration and not of limitation, and that other examples may be utilized without departing from the spirit and scope of the present invention, as set forth in the appended claims.

We claim:

1. A process for the production of a polyaspartate salt comprising the steps of:
   a.) passing an aqueous solution of ammonium fumarate over a bed of immobilized cells, wherein said cells contain aspartase, to produce an aqueous solution of ammonium aspartate;
   b.) adding to said solution of ammonium aspartate a sufficient quantity of a base to allow removal of the ammonium ion present in said solution by evaporation, said base selected from the group of bases consisting of sodium hydroxide, sodium bicarbonate, sodium carbonate, potassium hydroxide, potassium bicarbonate and potassium carbonate;
   c.) reducing the volume of said solution by evaporation thereby removing the ammonia contained in said solution;
   d.) acidifying said solution with a sufficient quantity of sulfuric acid to produce an aqueous mixture of aspartic acid and sodium bisulfate;
   e.) mixing and heating said mixture in a reactor at a temperature of 110°–300° C. for a length of time sufficient to convert at least 60% of the aspartic acid to polysuccinimide;
   f.) hydrolyzing said polysuccinimide with a base selected from the group of bases consisting of sodium hydroxide, sodium bicarbonate, sodium carbonate ammonium hydroxide, ammonia, potassium hydroxide, potassium carbonate and potassium bicarbonate to provide solution of a salt of polyaspartic acid.

2. The process of claim 1 further comprising after step e.) and before step f.) the step:
   e1.) washing said polysuccinimide with water to remove said sodium bisulfate.

3. The process of claim 1 further comprising after step f.) the step:
   g.) adding hydrogen peroxide to said solution of a salt of polyaspartic acid to reduce color.

4. A process for the production of a polysuccinimide comprising the steps of:
   a.) passing an aqueous solution of ammonium fumarate over a bed of immobilized cells, wherein said cells contain aspartase, to produce an aqueous solution of ammonium aspartate;
   b.) adding to said solution of ammonium aspartate a sufficient quantity of a base to allow removal of the ammonium ion present in said solution by evaporation, said base selected from the group of bases consisting of sodium hydroxide, sodium bicarbonate, sodium carbonate, potassium hydroxide, potassium bicarbonate and potassium carbonate;
   c.) reducing the volume of said solution by evaporation thereby removing the ammonia contained in said solution;
   d.) acidifying said solution with a sufficient quantity of sulfuric acid to produce an aqueous mixture of aspartic acid and sodium bisulfate;
   e.) mixing and heating said mixture in a reactor at a temperature of 110°–300° C. for a length of time sufficient to convert at least 60% of the aspartic acid to polysuccinimide.

5. The process of claim 4 further comprising after step e.) the step:
   f.) washing said polysuccinimide with water to remove said sodium bisulfate.

6. The process of claim 4 further comprising after step e.) the step:
   f1.) adding hydrogen peroxide to said mixture of polysuccinimide to reduce color.

* * * * *